United States Patent
Razavi Majomard et al.

(10) Patent No.: US 12,199,692 B2
(45) Date of Patent: Jan. 14, 2025

(54) NETWORK OPTIMIZATION FOR MITIGATION OF CROSSTALK BETWEEN NETWORK LINKS

(71) Applicant: Marvell Asia Pte Ltd, Singapore (SG)

(72) Inventors: Seid Alireza Razavi Majomard, Belmont, CA (US); Ron Cates, Carlsbad, CA (US); Ragnar Hlynur Jonsson, Aliso Viejo, CA (US); David Shen, Saratoga, CA (US)

(73) Assignee: Marvell Asia Pte Ltd, Singapore (SG)

( * ) Notice: Subject to any disclaimer, the term of this patent is extended or adjusted under 35 U.S.C. 154(b) by 304 days.

(21) Appl. No.: 17/752,562

(22) Filed: May 24, 2022

(65) Prior Publication Data

US 2022/0376740 A1 Nov. 24, 2022

Related U.S. Application Data

(60) Provisional application No. 63/192,452, filed on May 24, 2021.

(51) Int. Cl.
| | |
|---|---|
| *H04B 3/487* | (2015.01) |
| *H04B 3/21* | (2006.01) |
| *H04B 3/32* | (2006.01) |
| *H04L 12/28* | (2006.01) |

(52) U.S. Cl.
CPC ............ *H04B 3/487* (2015.01); *H04B 3/21* (2013.01); *H04B 3/32* (2013.01); *H04L 12/2801* (2013.01)

(58) Field of Classification Search
CPC ..................................................... H04B 3/487
See application file for complete search history.

(56) References Cited

U.S. PATENT DOCUMENTS

| | | | |
|---|---|---|---|
| 8,179,910 B2 | 5/2012 | Diab et al. | |
| 9,893,756 B1* | 2/2018 | Sedarat | H04B 1/0458 |
| 10,069,521 B1* | 9/2018 | Farjadrad | H04B 3/32 |
| 10,985,801 B1* | 4/2021 | Shen | H04B 3/48 |
| 10,999,124 B1* | 5/2021 | Sedarat | H04L 47/25 |

(Continued)

OTHER PUBLICATIONS

How Much Does Office Building Wiring Cost? CostOwl.com, available at hllps://www.costowl.com/b2b/cabling-wiring/cabling-wiring-office-building-cost/#network-cabling-considerations, last updated Dec. 8, 2021 (2 pages).

(Continued)

*Primary Examiner* — Guang W Li (57) ABSTRACT

A network controller receives link metrics for network links on cables between network devices in a communication network. The link metrics include metrics indicative of crosstalk experienced by network links among the network links on cables. The network controller determines, based at least in part on the link metrics, respective link settings for respective network links among the network links. The link settings are determined to mitigate crosstalk experienced by the respective network links as a result of transmission of signals in at least some of the network links at baud rates that correspond to bandwidths that exceed maximum bandwidth ratings of respective cables of the corresponding ones of the network links. The network controller causes configuration of the respective network links based on the link settings to optimize performance across the plurality of network links in the communication network.

20 Claims, 3 Drawing Sheets

(56) References Cited

U.S. PATENT DOCUMENTS

| | | | |
|---|---|---|---|
| 11,228,340 B1* | 1/2022 | Lim | H04B 3/487 |
| 2003/0097643 A1* | 5/2003 | Saito | H04L 45/28 |
| | | | 716/132 |
| 2004/0156345 A1* | 8/2004 | Steer | H04L 45/12 |
| | | | 370/395.31 |
| 2008/0285573 A1* | 11/2008 | Diab | H04N 7/106 |
| | | | 370/401 |
| 2014/0153630 A1* | 6/2014 | Strobel | H04L 1/0001 |
| | | | 375/229 |
| 2015/0263809 A1* | 9/2015 | Gupta | H04B 10/25 |
| | | | 398/66 |
| 2018/0220210 A1* | 8/2018 | Paraschis | H04Q 11/0071 |
| 2019/0319728 A1* | 10/2019 | Strobel | H04B 3/32 |
| 2020/0295911 A1 | 9/2020 | Wu et al. | |
| 2021/0135710 A1* | 5/2021 | Tsiaflakis | H04B 3/548 |
| 2021/0288661 A1* | 9/2021 | Nuzman | H03M 7/6011 |
| 2022/0190875 A1 | 6/2022 | Razavi Majomard et al. | |

OTHER PUBLICATIONS

Barrass et al., "10GBASE-T: 10 Gigabit Ethernet over Twisted-pair Copper," v. 1.0, Ethernet Alliance, 44 pages (Aug. 2007).
International Search Report and Written Opinion for PCT/US2022/030736 mailed on Aug. 18, 2022. (13 pages).
Jones, "10GBASE-T Tutorial Overview," Institute for Electrical and Electronics Engineers, 34 pages, available at https://www.ieee802.org/3/10GBT/public/jan03/jones_2_0103.pdf (Jan. 2003).
Muller et al., "IEEE 802 10GBASE-T Tutorial Overview," Institute for Electrical and Electronics Engineers, 56 pages, available at https://www.ieee802.org/3/10GBT/public/nov03/10GBASE-T tutorial.pdf (Nov. 2003).
Unberboeck, "10GBASE-T: 10Gbits/s Ethernet over copper," Broadcom, 23 pages, available at https://www.southampton.ac.uk/~sqc/EL336/10GBASE-T.pdf (Sep. 2006).
U.S. Appl. No. 17/752,534, filed May 24, 2022.

* cited by examiner

NETWORK OPTIMIZATION FOR MITIGATION OF CROSSTALK BETWEEN NETWORK LINKS

CROSS REFERENCES TO RELATED APPLICATIONS

This application claims the benefit of U.S. Provisional Patent Application No. 63/192,452, entitled "Rate-Adaptive Profile for Enterprise Network," filed on May 24, 2021, the disclosure of which is hereby expressly incorporated herein by reference in its entirety.

FIELD OF TECHNOLOGY

The present disclosure relates generally to communication networks, and more particularly to Ethernet communications via twisted pair cables.

BACKGROUND

One gigabit per second (1G) and slower Ethernet networks have proliferated in office buildings, schools, residential housing, etc., over the past two decades. 1G and slower Ethernet networks often employ Category 5 (Cat5) or Category 5e (Cat5e) twisted pair copper cables, comprising multiple twisted wire pairs. As a result, there is currently a large installed base 1G and slower Ethernet networks using Cat5 and Cat5e cables.

The Institute for Electrical and Electronics Engineers (IEEE) published several standards for Ethernet networks that utilize 10 gigabit per second (10G) communications over optical and copper cabling in the early to mid-2000s. For example, the IEEE 802.3ae Standard (2002) defines a communication protocol for 10G Ethernet over optical fiber, and the IEEE 802.3ak Standard (2004) defines a communication protocol for 10G Ethernet over twin-axial cable. The IEEE 802.3an Standard (2006) defines a communication protocol for 10G Ethernet over copper twisted pair cable.

The higher baud rate of 10G Ethernet as compared to 1G and slower Ethernet tends to cause more crosstalk between twisted pair copper cables. Cat5 and Cat5e cables generally are not rated for use with 10G Ethernet, mainly due to reduced performance caused by increased crosstalk between cables at the higher baud rate of 10G Ethernet. Thus, it is common for 10G Ethernet network deployments to use Cat6 or Cat6A (or even Category 7 (Cat7)) cables. Partly as a result of the high cost of replacing the large existing installed base of Cat5 and Cat5e cables with Cat6 or Cat6A (or even Cat7) cables, there is currently a relatively small number of 10G Ethernet networks in office buildings, schools, residential housing, etc.

In current Ethernet networks, link settings used for communication over Ethernet network links on cables in a network are typically auto-negotiated by "link partner" devices that are communicating over the cables in the network. In auto-negotiation, the link partner devices typically select best link parameters supported by both devices, such as a highest baud rate supported by both devices; thus, two devices that support 10G Ethernet operation will typically communicate using baud rate corresponding to 10G Ethernet over the cable. However, transmission at the baud rate corresponding to 10G Ethernet over a cable that is not rated for 10G Ethernet causes significant amount of crosstalk in neighboring cables in the network that adversely effects communication over the neighboring cables in the network. Thus, using 10G Ethernet devices with installed cables that are rated for lower baud rates will typically lead to inadequate network performance for at least some of the network links in existing Ethernet networks.

SUMMARY

In an embodiment, a method for configuring a plurality of network links on a plurality of cables between network devices in a communication network includes: receiving, at a network controller, link metrics including metrics indicative of crosstalk experienced by network links among the plurality of network links on the plurality of cables, the plurality of cables comprising respective cables having maximum bandwidth ratings; determining, at the network controller based at least in part on the link metrics, respective link settings for respective network links among the plurality of network links, the respective link settings determined to mitigate crosstalk experienced by the respective network links as a result of transmission of signals in at least some of the network links at baud rates that correspond to bandwidths that exceed maximum bandwidth ratings of respective cables of the corresponding ones of the network links; and causing, by the network controller device, configuration of the respective network links based on the link settings to optimize performance across the plurality of network links in the communication network.

In another embodiment, a network controller comprises a processor and a memory storing instructions that, when executed by the processor, cause the processor to: receive link metrics for a plurality of network links on a plurality of cables between network devices in a communication network, the link metrics including metrics indicative of crosstalk experienced by network links among the plurality of network links on the plurality of cables, the plurality of cables comprising respective cables having maximum bandwidth ratings; determine, based at least in part on the link metrics, respective link settings for respective network links among the plurality of network links, the respective link settings determined to mitigate crosstalk experienced by the respective network links as a result of transmission of signals in at least some of the network links at baud rates that correspond to bandwidths that exceed maximum bandwidth ratings of respective cables of the corresponding ones of the network links; and cause configuration of the respective network links based on the link settings to optimize performance across the plurality of network links in the communication network.

DETAILED DESCRIPTION

As mentioned above, there is currently a large installed base 1G and slower Ethernet networks using Cat5 and Cat5e cables. However, both the need for higher data speeds and the availability of 10 gigabit per second (10G) Ethernet ports have increased significantly in recent years. Thus, the desire to upgrade existing 1 gigabit per second (1G) and slower Ethernet networks is growing. One obstacle to upgrading existing 1G and slower Ethernet networks, however, is the cost of upgrading the cabling required for 10G Ethernet. Cat6 and Cat6a cables are more expensive than Cat5 and Cat5e cables. More importantly, the cost of labor to replace Cat5 and Cat5e cables with Cat6 or Cat6a cables is significant, and the process of cable replacement likely will be very disruptive to users of an Ethernet network, workers of an office building, residents of an apartment building, etc., for example.

In current Ethernet networks, network link settings, such as baud rate, effective data rate, transmit power level, etc., of various network links between network devices are determined for each individual network link, typically by auto-negotiation performed by network devices when establishing the network link. Such link settings, however, may not be optimal for performance of the network, particularly in networks that deploy cables that are not rated for high baud rates (e.g., 10G or 100G Ethernet baud rates) used for transmission of signals on at least some of the network links. In embodiments described below, global optimization of link settings in a particular network is performed based on knowledge about the particular network, such as link metrics indicative of crosstalk experienced by network links in the particular network, predicted usage of network links in the particular network, requirements for network links in the particular network, etc. Such global optimization of the network link settings mitigates effects of crosstalk between cables that are not rated for high baud rates used for transmission over the cables, while maintaining suitable performance and meeting requirements for the network links in the network, in at least some embodiments. Thus, such global optimization of the network link settings allows use of the higher baud rates on at least some network links with existing, already installed cables (e.g., Cat5 and Cat5e cables, or even Cat3 cables), i.e., without having to install new cabling, while still providing adequate performance of the entire network, in at least some embodiments.

Figure 1:
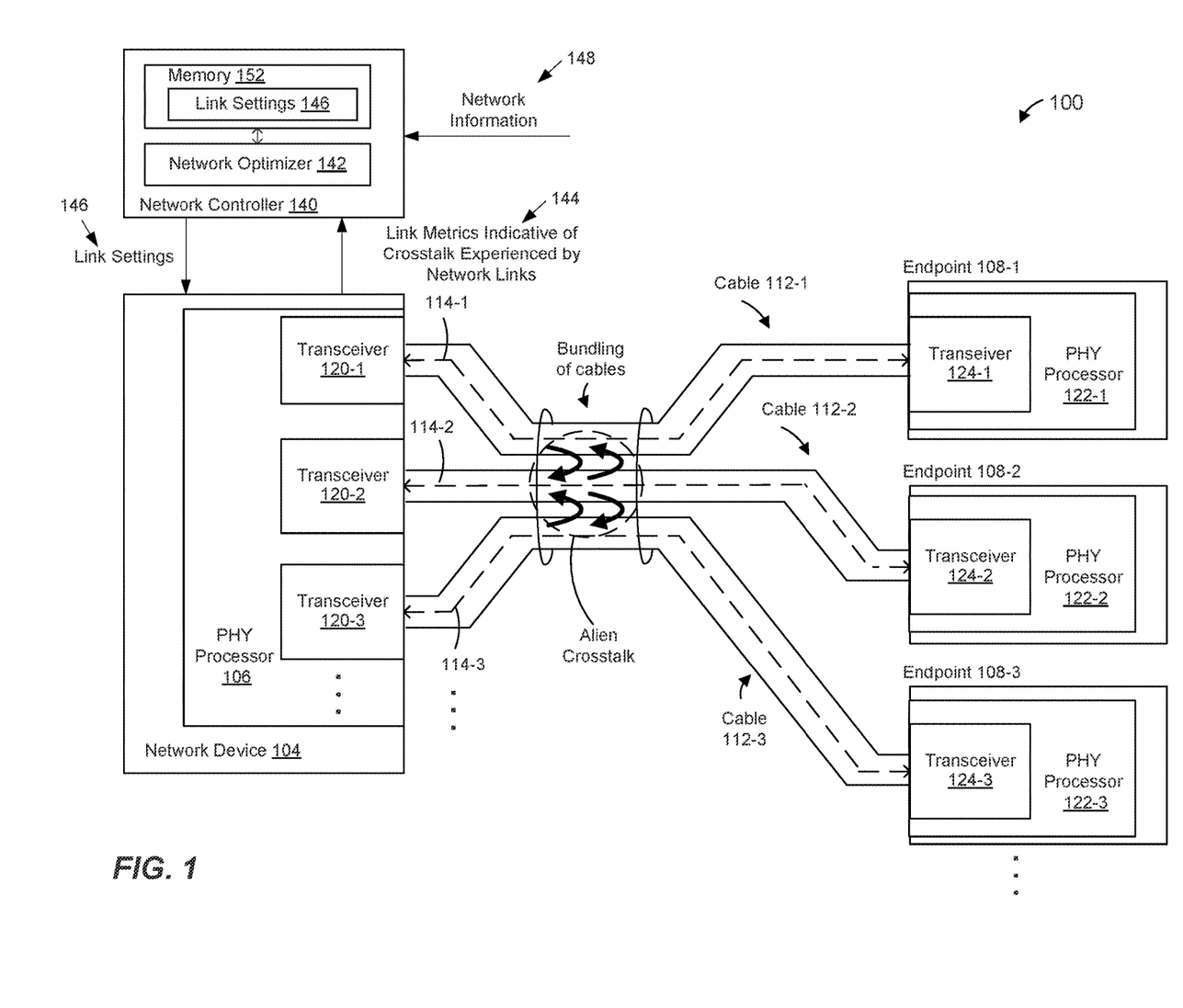
FIG. 1 is a simplified diagram of an example communication network in which link settings for network links over cables between network devices are optimized based on link metrics indicative of crosstalk experienced by the network links during operation of the communication network, according to an embodiment.

FIG. 1 is a simplified diagram of an example communication network 100, according to an embodiment. The communication network 100 includes a network device 104, such as a router, a switch, a hub, etc., communicatively coupled to a plurality of endpoint devices 108 (e.g., computers, televisions, gaming systems, medical equipment, etc.) via respective cables 112. As an illustrative example, the communication network 100 is located in an office building, and the endpoint devices 108 correspond to computers in different workstations (e.g., offices, cubicles, etc.), printers, etc. throughout the office building. As another illustrative example, the communication network 100 is located in a multi-family residential building, and the endpoint devices 108 correspond to computers, televisions, gaming systems, etc., throughout the residential building. As another illustrative example, the communication network 100 is located in a healthcare facility, and the endpoint devices 108 correspond to medical equipment, computers, televisions, etc. throughout the healthcare facility.

The network device 104 includes one or more physical layer (PHY) processors 106 (sometimes referred to herein as "the PHY processor 106" for brevity). The PHY processor 106 includes a plurality of transceivers 120, each communicatively coupled to a respective cable 112. Similarly, each endpoint 108 includes one or more PHY processors 122 (sometimes referred to herein as "the PHY processor 122 for brevity), and each of the PHY processors 122 includes a respective transceiver 124 communicatively coupled to a cable 112, in an embodiment. Although the PHY processor 106 is illustrated as including three transceivers 120, the PHY processor 106 includes other numbers (e.g., 1, 2, 4, 5, etc.) of transceivers 120, in other embodiments. Similarly, although the communication network 100 is illustrated as including three endpoint devices 108, the communication network 100 includes other numbers (e.g., 1, 2, 4, 5, etc.) of endpoint devices 108, in other embodiments. Further, although each endpoint 108 is illustrated as including a single transceiver 124 communicatively coupled to a single cable 112, in some embodiments, an endpoint device 108 includes multiple transceivers 124 communicatively coupled to multiple respective cables 112.

One or more of the cables 112 are Class C cables (sometimes referred to as a Category 3 (Cat3) cable) or Class D cables (sometimes referred to as a Category 5e (Cat5e) cable) as specified by the ISO/IEC 11801 standard, according to an embodiment. A Class C (Cat3) cable comprises a plurality of twisted copper wire pairs and is typically rated for certain performance and test requirements up to 16 MHz. A Class D (Cat5e) cable comprises a plurality of twisted copper wire pairs and is typically rated for certain performance and test requirements up to 100 MHz. One or more of the cables 112 are Category 5 (Cat5) cables specified by an older version of the ISO/IEC 11801 standard and, like Cat5e cables, are rated for certain performance and test requirements up to 100 MHz (according to the older version of the ISO/IEC 11801 standard). Category 3 cables, Category 5 cables, and Category 5E cables are sometimes referred to herein as "legacy cables."

In comparison, Class E cables (sometimes referred to as Category 6 (Cat6) cables) as specified by the ISO/IEC 11801 standard and Class EA cables (sometimes referred to as Category 6A (Cat6A) cables) as specified by the ISO/IEC 11801 standard are rated for certain performance and test requirements up to 250 MHz and 500 MHz, respectively. Class F cables (sometimes referred to as Category 7 (Cat7) cables) as specified by the ISO/IEC 11801 standard are rated for certain performance and test requirements up to 600 MHz. On the other hand, a legacy cable may not be rated for any performance or test requirements above 100 MHz according to the ISO/IEC 11801 standard, according to some embodiments.

In some embodiments, one or more other cables 112 are legacy cables that are not rated for any performance or test requirements above 100 MHz. In some embodiments, one or more other cables 112 are rated for performance or test requirements above 100 MHz. For example, one or more other cables 112 are Cat6, Cat6a, or Cat7 cables, according to an embodiment.

As illustrated in FIG. 1, at least cables 112-1, 112-2, and 112-3 are bundled together for cable management. The bundling of cables 112-1, 112-2, and 112-3 generally increases crosstalk between the cables 112-1, 112-2, and 112-3. For example, transmissions within cable 112-1 and transmissions within cable 112-3 both cause crosstalk into cable 112-2. Similarly, transmissions within cable 112-2 cause crosstalk into cable 112-1 and cable 112-3. Such crosstalk is sometimes referred to as "alien crosstalk" because the crosstalk experienced by one cable 112 is caused by transmissions in another cable 112, as opposed to crosstalk between different twisted wire pairs within a single cable 112.

In other embodiments, at least some cables 112 (e.g., at least cables 112-1, 112-2, and 112-3) are not bundled, but are otherwise deployed in an arrangement that results in alien crosstalk between cables 112. For example, cables 112 that run together in close proximity (while not being bundled with a strap or tie) for a span may experience alien crosstalk. In other embodiments, at least some alien crosstalk occurs because of close proximity between ports of the network device to which respective cables 112 are connected, as opposed to bundling of cables 112 or close proximity of cables 112.

The network device 104 and the endpoint devices 108 are configured to establish network links 114 over the cables 112, and to configure the network links 114 for communication between the network device 104 and the endpoint devices 108 over the cables 112. In an embodiment, the network device 104 and the endpoint devices 108 are configured to negotiate or otherwise determine link settings for configuring the network links 114, such as baud rates, effective data rates, transmit power levels, etc. to be used for communication over the network links 114. The PHY processor 106 of the network device 104 is configured to configure the respective transceivers 120 to operate using the respective link settings negotiated or otherwise determined for communication over the network links 114. Similarly, the PHY processors 122 of the endpoint device 108 are configured to configure the respective transceivers 124 to operate using the respective link settings negotiated or otherwise determined for communication over the network links 114.

In at least some situations, in various embodiments, transmission of signals via ones of the network links 114 over cables 112 is adversely affected by concurrent transmission of signals via other ones of the network links 114 over cables 112, for example due to crosstalk between the network links 114 over the cables 112. Moreover, in at least some situations, different link settings used for transmission of signals via ones of the network links 114 over cables 112 have different effects on concurrent transmission of signals via other ones of the network links 114 over cables 112. For example, signals transmitted at relatively higher baud rates and/or relatively higher effective data rates on a network link 114 generally cause more crosstalk in neighboring network links 114 as compared to signals transmitted at relatively lower baud rates and/or relatively lower effective data rates, in an embodiment. As another example, signals transmitted at relatively higher transmit power levels on a network link 114 generally cause more crosstalk in neighboring network links 114 as compared to signals transmitted at relatively lower transmit power levels, in an embodiment.

In an embodiment, crosstalk caused by transmission of signals on network links 114 over the cables 112 also depends on the qualities and ratings of the cables 112. As discussed above, at least some of the cables 112 are legacy cables that are not rated for transmission of signals at higher baud rates, such as baud rates corresponding to 10G or higher speed Ethernet, in an embodiment. Transmission of signals in such cables 112 at baud rates corresponding to 10G or higher speed Ethernet causes significant crosstalk experienced on neighboring network links 114, in at least some situations, in various embodiments.

In an embodiment, the communication network 100 includes a network controller 140 communicatively coupled to the network device 104 and, optionally, to one or more endpoint devices 108. The network controller 140 includes a network optimizer 142 configured to acquire knowledge about the communication network 100, such as patterns of usage of the network links 114 in communication network 100, crosstalk experienced by the network links 114 in the communication network 100 etc., and to determine link settings for the network links 114 based on the knowledge about the communication network 100.

In an embodiment, the network optimizer 142 is configured to acquire knowledge about the communication network 100 by analyzing link metrics 144 received from the network device 104 and/or the endpoint devices 108 of the communication network 100. The link metrics 144 include metrics that capture quality of network links 114 and activities on the network links 114 at various times throughout operation of the communication network 100, in an embodiment. In an embodiment, the link metrics 144 include, for each of at least some of the network links 114, one or more of i) bit error rate for data transmitted in the downlink (e.g., from the network device 104 to the endpoint devices 108) and/or uplink direction (e.g., from the endpoint devices 108 to the network device 104) via the network link 114, ii) frame error rate for data transmitted in the downlink and/or uplink direction via the network link 114, iii) number of correctable errors in data transmitted in the downlink and/or uplink direction via the network link 114, iv) signal to noise ratio (SNR) in signals transmitted in the downlink and/or uplink direction via the network link 114. In some embodiments, the link metrics 142 additionally include metrics indicative of activity on the network links 114, such as levels of activity on the network links 114, types of activities performed on the network links 114, such as types of data transmitted over the network links 114, target applications for the data transmitted over the network links 114, etc.

The network controller 140 is configured to obtain the link metrics 144 during setup of the communication network 100 and/or during maintenance of the communication network 100, for example. In some embodiments, the network optimizer 142 is configured to obtain link metrics 144 at different times of the day during operation of the communication network 100 to capture link quality data and patterns of usage of the communication network 100 throughout the day.

In an embodiment, the network optimizer 142 is configured to analyze the link metrics 144 to determine relationships between transmission of signals on ones of the network links 114 and qualities of other ones of the network links 114. For example, the network optimizer 142 determines that transmission of signals on the network link 114-1 results in relatively large levels of crosstalk experienced on the network link 114-2. On the other hand, the network optimizer 142 determines that transmission of signals on the network link 114-1 results does not cause significant levels of crosstalk on the network link 114-3, for example. In some embodiments, the network optimizer 142 is further configured to learn, based on analyzing the link metrics 144, usage patterns of the network links 114. For example, the network optimizer 142 learns times of day during which respective network links 114 are typically active, typical levels of activity on the respective network links 114, types of activities performed via the network links 114, such as types of data transmitted at various times of day over the network links 114, etc., in various embodiments.

In some embodiments, the network optimizer 142 is further configured to receive network information 148 providing additional information about the communication network 100. In an embodiment, the network information 148 is provided at least partially by a network operator, for example, via a user interface provided to the network operator. In an embodiment, the network information 148 includes information descriptive of respective network links 114, such as topology of the respective network links 114, types of endpoint devices 108 (e.g., computer, printer, etc.) coupled to the respective network links 114, specific users (e.g., chief executive officer (CEO), employee, administrative assistant, etc.) of the endpoint devices 108 coupled to the respective network links 114, whether the respective network links 114 are primarily one directional network links (e.g., a network link 114 between the network device 104 and a printer, where data is primarily transmitted in the downlink direction from the network device 104 to the printer) or bi-directional links (etc. e.g., a network link 114 between the network device 104 and a workstation, where data is transmitted in both the downlink direction and the uplink direction between the network device 104 and the workstation), etc. In some embodiments, the network information 148 additionally or alternatively includes provisioning requirements for at least some of the network links 114. For example, the network information 148 includes indications of network links 114 for which a maximum supported baud rate is to be maintained throughput operation of the network link 114 or is to be provided at specific times during operation of the network link 114. Additionally or alternatively, in some embodiments, the network information 148 includes indications of respective baud rates to be maintained for respective network links 114 throughput operation of the network links 114 or at specific times during operation of the network links 114. In an embodiment, the network information 148 includes indications of scheduled or anticipated usage of the network links 114. For example, the network information 148 includes a schedule of events, such as meetings, training sessions, etc. expected to affect usage of the network links 114, in an embodiment.

In an embodiment, the network information 148 includes indications of various PHY parameters supported by the PHY processor 106 of the network device 104 and the respective PHY processors 122 of the endpoint devices 108, such as baud rates, effective data rates, transmit power levels, etc. supported by the respective transceivers 120 of PHY processor 106 of the network device 104 and the respective transceivers 124 of the respective PHY processors 122 of the endpoint devices 108. In some embodiments, the indications of various PHY parameters supported by the respective transceivers 120 of the network device 104 and the respective transceivers 124 of the endpoint devices 108 are additionally or alternatively obtained by the network optimizer 142 by querying the PHY processor 106 of the network device 104 and the respective PHY processors 122 of the endpoint devices 108, for example.

In an embodiment, the network optimizer 142 is configured to determine link settings 146 for the network links 114 based on the analysis of the link metrics 144 and the network information 148. The link settings 146 include respective PHY parameters to be used for communication in downlink and/or uplink directions on respective network links 114, in an embodiment. For example, the link settings 146 for a particular network link 114 include one or more of i) a baud rate to be used for transmission of signals in the uplink direction on the particular network link 114, ii) a baud rate to be used for transmission of signals in the uplink direction on the particular network link 114, iii) an effective data rate to be used for transmission of signals in the uplink direction on the particular network link 114, iv) an effective data rate to be used for transmission of signals in the downlink direction on the particular network link 114, iv) transmit power level to be used for transmission of signals in the uplink direction on the particular network link 114, and vi) transmit power level to be used for transmission of signals in the downlink direction on the particular network link 114. In other embodiments, the link settings 146 additionally or alternatively include other suitable network link settings. In an embodiment, the network optimizer 142 is configured to optimize overall performance on the network links 114 by selecting, from a set of link settings supported by the network link 114, optimal link settings for each network link 114 that ensure adequate or required performance on the network link 114 while also ensuring that transmission on the network link 114 will not cause unacceptable cross talk on neighboring network links 114.

In an embodiment, the network optimizer 142 is configured to consider symmetric link configurations as well as asymmetric link configurations when determining link settings 146 for the network links 114. In symmetric link configurations, a PHY parameter used for transmission in the uplink direction on the network link 114 is the same as the PHY parameter used for transmission in the downlink direction on the network link 114. For example, a same baud rate is used for transmission in the downlink direction on a network link 114 and in the uplink direction on the network link 114. As another example, a same transmit power level, same effective data rate, etc. is used for transmission in the downlink direction on a network link 114 and in the uplink direction on the network link 114. On the other hand, in asymmetric link configuration, a PHY parameter used for transmission in the uplink direction on a network link 114 is different from the PHY parameter used for transmission in the downlink direction on the network link 114. For example, different baud rates, effective data rates, transmit power levels, etc. are used for transmission in uplink and downlink directions on a network link 114. As a more specific example, in an embodiment, the network optimizer 142 determines, for at least one of the network links 114, i) a first baud rate for transmission of data in downlink direction via the network link and ii) a second baud rate for transmission of data in uplink direction via the network link, the second baud rate being different (e.g., higher or lower) from the first baud rate, in an embodiment. As another example, the network optimizer 142 determines, for at least one of the network links 114, i) a first effective data rate for transmission of data in downlink direction via the network link 114 and ii) a second effective data rate for transmission of data in uplink direction via the network link 114, the second effective data rate being different (e.g., higher or lower) from the first effective data rate, in an embodiment. As yet another example, the network optimizer 142 determines, for at least one of the network links 114, i) a first transmit power level for transmission of data in downlink direction via the network link 114 and ii) a second transmit power level for transmission of data in uplink direction via the network link 114, the second transmit power level being different (e.g., higher or lower) from the first transmit power level, in an embodiment.

In some cases, asymmetric link configuration of a network link 114 causes less crosstalk and/or allows mitigation of crosstalk in transceivers 120, 124 corresponding to the network link 114. Thus, in some embodiments, the link settings 146 include asymmetric link settings for at least some of the network links 114. In some cases, the link settings 146 include i) symmetric link settings to be used for one or more of the network links 114 and ii) asymmetric link settings for other one or more of the network links 114. In another embodiment, the link settings 146 include either symmetric link settings or asymmetric link settings for all of the network links 114.

In an embodiment, the network optimizer 142 comprises one or more machine learning models, such as one or more neural networks, trained or otherwise configured to analyze the link metrics 144 to detect relationships between transmission of signals on ones of the network links 114 and qualities of other ones of the network links 114, to detect patterns of usage of the network links 114, etc. and to determine the link settings 146 to optimize performance of the network links 114. In an embodiment, the network optimizer 142 is configured to perform multiple iterations of determining the links settings 146, providing the determined link settings 146 to the network device 104 and/or endpoint devices 108, obtaining link metrics 144 when the network links 114 are configured according to the link settings 146 and adjusting the links settings 146 to better optimize performance across the network links 114. In other embodiments, the network optimizer 142 is configured to analyze the link metrics 144 and to determine the link settings 146 in other suitable manners.

The network controller 140 is configured to provide the determined link settings 146 to the network device 104 and/or the endpoint devices 108 to control configuration of the network links 114 at the network device 104 and/or the endpoint devices 108. In an embodiment, the PHY processor 106 of the network device 104 is configured to configure the transceivers 120 based on the link settings 146 received from the network controller 140. For example, the PHY processor 106 of the network device 104 is configured to configure respective transceivers 120 to utilize PHY parameters, such as baud rate, effective data rate, indicated for the corresponding network links 114 in the link settings 146. Similarly, the PHY processors 122 of the endpoint devices 108 are configured to configured to configure respective transceivers 124 to utilize PHY parameters, such as baud rate, effective data rate, indicated for the corresponding network links 114 in the link settings 146, in an embodiment.

In some embodiments, the network controller 140 is configured to provide different link settings 146 to the network device 104 and/or endpoint devices 108 at different times of operation of the communication network 100. For example, the network optimizer 142 is configured determine different sets of link settings 146 to be used at different times throughout the day (e.g., morning, lunchtime, evening, every hour, etc.), the different sets of link settings 146 determined to optimize performance across the network links 114 for different usage patterns of the communication network 100 throughout the day, and to store the different sets of link settings 146 in a memory 152 coupled to the network optimizer 142. The network controller 140 is configured to, at appropriate times of day throughout operation of the communication network 100, retrieve corresponding link settings 146 from the memory 152 and provide the retrieved link settings 146 to the network device 104 and/or the endpoint devices 108, in an embodiment. In some embodiments, the network controller 140 is configured to additionally or alternatively dynamically adjust link settings 146 based on link metrics 144 received by the network controller 140 during operation of the communication network 100.

The PHY processor 106 of the network device 104 is configured to receive the different link settings 146 at the different times of operation of the communication network 100 and/or the dynamically adjusted links settings 146 during operation of the communication network 100, and to reconfigure the network links 114 according to the received link settings 146, in an embodiment. Similarly, the PHY processors 122 of the endpoint devices 108 are configured to receive the different link settings 146 at the different times of operation of the communication network 100, and to reconfigure the network links 114 according to the received link settings 146, in an embodiment. In some embodiments, the network optimizer 142 is configured to learn or otherwise determine amounts of time that it takes to apply changes for respective PHY parameters at the network device 104 and/or the endpoint devices 108 and to rule out certain changes if the changes would interrupt communications between the network device 104 and an endpoint device 108 for significant time durations, for example.

In an embodiment, the PHY processor 106 is configured apply the link settings 146 for the network links 114 during establishment of the network links 114 (e.g., during auto-negotiation phase of link establishment, during training phase of link establishment, etc.) and/or during data mode after establishment of the network links 114. For example, the PHY processor 106 is configured to set a baud rate for the network link 114, indicated in the link settings 146, during link establishment (e.g., during auto-negotiation phase of link establishment) of the network link 114, in an embodiment. As another example, the PHY processor 106 is configured to, during link establishment (e.g., during auto-negotiation phase of link establishment, during training phase of link establishment, etc.) of a network link 114, configure a transceiver 120 corresponding to the network link 114 to utilize a coding scheme and/or signal constellation to achieve an effective data rate indicated in the link settings 146 for the network link 114. In an embodiment, the PHY processor 106 is configured to reconfigure the transceiver 120 corresponding to the network link 114 to utilize a new coding scheme and/or signal constellation to achieve new effective data rate indicated in the link settings 146, received from the network controller 140 during operation of the network link 114, in data mode of communication over the network link 114. As another example, in an embodiment, the PHY processor 106 is configured to implement time division multiplexing between the network links 114, during data mode of communication over the network links 114, based on indications included in the link settings 146 for the network links 114.

As yet another example, the PHY processor 106 is configured to, during link establishment (e.g., during auto-negotiation phase of link establishment, during training phase of link establishment, etc.) of the network link 114, set transmit power level for transmission over a network link 114 based on a transmit power level indication in the link settings 146 for the network link 114. In an embodiment, the PHY processor 106 is configured to set transmit power level for transmission over a network link 114 based on a new transmit power level indication in the link settings 146 for the network link 114, received from the network controller 140, in data mode of communication over the network link 114. In some embodiments, the PHY processor 106 is configured to initiate a fast retrain process during data mode of communication over a network link 114 to set one or more of i) a new coding scheme, ii) a new signal constellation, iii) a new transmit power, etc., based on corresponding one or more indications in the link settings 146 for the network link 114, received from the network controller 140, in data mode of communication over the network link 114. Although configuration and reconfiguration of PHY parameters of network links 114 is described with reference to the PHY processor 106 of the network device 104, the PHY processors 122 of the endpoint devices 108 are additionally or alternatively configured to configure and/or reconfigure PHY parameters for the network links 114 based on the link settings 146 during establishment of the network link 114 and/or during data mode after establishment of the network link 114 as described above, in some embodiments. Techniques described herein for optimization and configuration of link settings for the network links 114 mitigates crosstalk experienced by the respective network links 114 that results from transmission of signals in at least some of the network links 114 at baud rates that correspond to bandwidths that exceed maximum bandwidth ratings of respective cables 112 that carry signals of the network links 114, in at least some embodiments.

Figure 2:
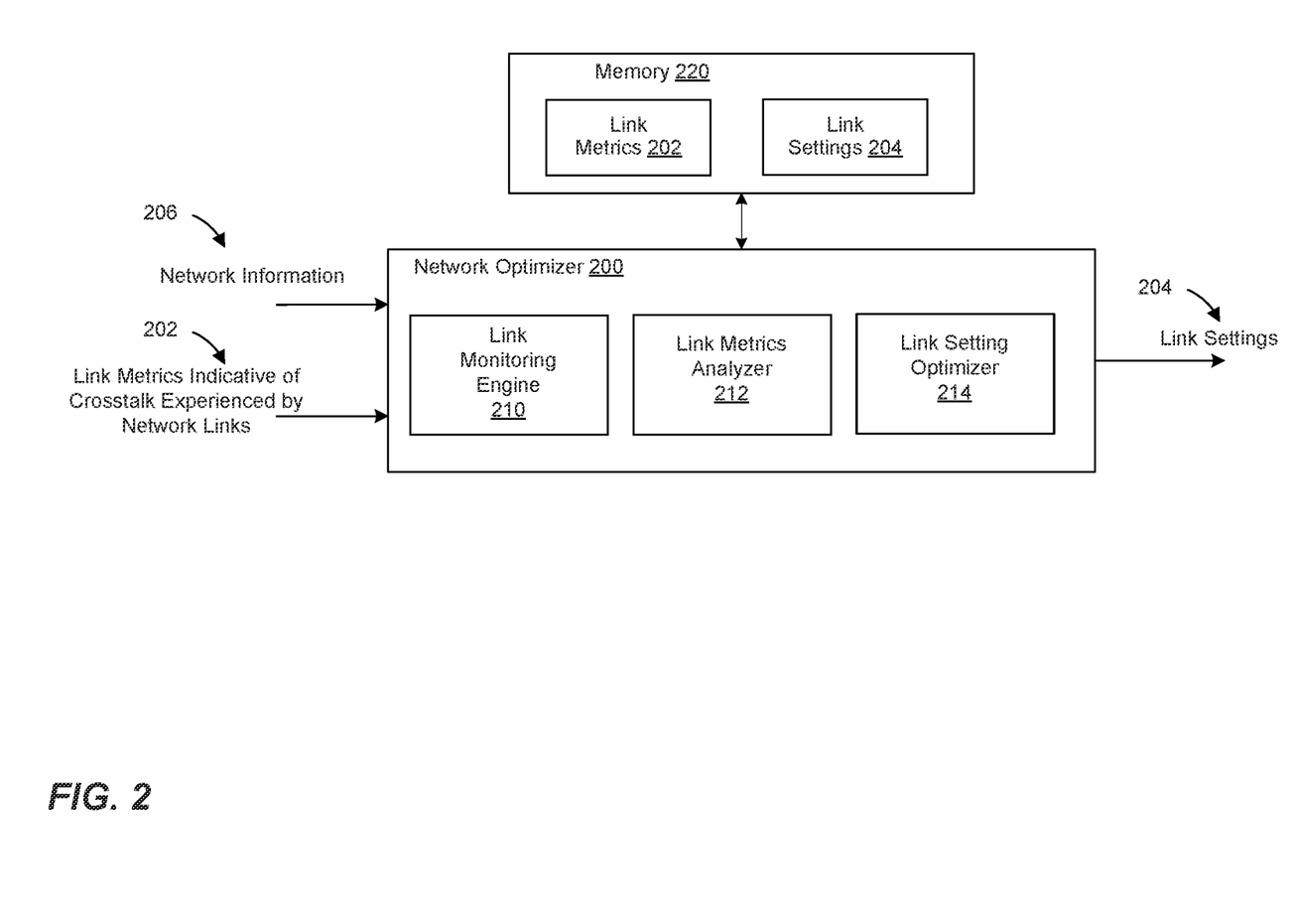
FIG. 2 is a simplified diagram of an example network optimizer configured to optimize link settings for network links over cables between network devices based on link metrics indicative of crosstalk experienced by the network links during operation of the communication network of FIG. 1, according to an embodiment.

FIG. 2 is a block diagram of an example network optimizer 200, according to an embodiment. The network optimizer 200 corresponds to the network optimizer 142 of the network controller 140 of communication network 100 FIG. 1, and the network optimizer 200 is described with reference to FIG. 1 for ease of explanation. In other embodiments, the network optimizer 200 is utilized with network controllers different from the network controller 140 of FIG. 1 and/or with communication networks different from the communication network 100 of FIG. 1. Similarly, the network optimizer 142 of the network controller 140 of communication network 100 FIG. 1 is different from the network optimizer 200, in some embodiments.

The network optimizer 200 is configured to receive link metrics 202 (e.g., corresponding to the link metrics 144 of FIG. 1) indicative of relationships between transmission of signals on respective ones of the network links 114 in the communication network 100 such as crosstalk experienced by ones of network links 114 as a result of transmission of signals on other ones of the network links 114 during operation of the communication network 100, and to determine link settings 204 (e.g., corresponding to the network link settings 146 of FIG. 1) that improve or optimize performance across the network links 114 in the communication network 100, in an embodiment. In some embodiments, the network optimizer 200 is additionally configured to receive network information 206 (e.g., corresponding to the network information 148) provided, for example, by an operator of the communication network, and to determine the network link settings 204 further based on the network information 206 to ensure that the determined link settings 204 meet link provisioning requirements 206, for example.

The network optimizer 200 includes a link monitoring engine 210, a link metrics analyzer 212 and a link setting optimizer 214, in an embodiment. The link monitoring engine 210 is configured to obtain the link metrics 202 for i) signals transmitted via the network links 114 in the downlink direction from the network device 104 to the endpoint devices 108 and/or ii) signals transmitted via the network links 114 in the uplink direction from the endpoint devices 108 to the network device 104, in an embodiment. In an embodiment, the link metrics 202 include, for each of some or all of the network links 114, one or more of i) bit error rate for data transmitted in the downlink and/or uplink direction via the network link 114, ii) frame error rate for data transmitted in the downlink and/or uplink direction via the network link 114, iii) number of correctable errors in data transmitted in the downlink and/or uplink direction via the network link 114, iv) signal to noise ratio (SNR) in signals transmitted in the downlink and/or uplink direction via the network link 114. In other embodiments, the link metrics 202 additionally or alternatively includes other suitable link metrics indicative of relationships between qualities of network links 114 in the communication network 100.

The link monitoring engine 210 is configured to obtain the link metrics 202 from the network from the network device 104 and/or endpoint devices 108 during setup, maintenance and/or regular operation of the communication network 100, in various embodiments. For example, the link monitoring engine 202 is configured collect link metrics 202 for a certain period of time when the network optimizer 200 is first deployed in the communication network 100, such as for a certain period of time after initial setup of the communication network 100, to capture characteristics of the network links 114 during operation of the communication network 100. The link monitoring engine 202 is configured to store the link metrics 202 collected for the certain period of time after initial setup of the communication network 100 in a memory 220 coupled to the network optimizer 200, in an embodiment. In some embodiments, the link monitoring engine 202 is configured to control settings of the network links 114 as the link metrics 202 are being collected the link monitoring engine 202, to capture characteristics of the network links 114 with various settings of the network links 114. For example, the link monitoring engine 202 is configured to collect link metrics 202 while systematically varying one or more of i) respective baud rates used for uplink and/or downlink transmission in respective network links 114, ii) respective effective data rates used for uplink and/or downlink transmission in respective network links 114 and iii) respective transmit power levels used for uplink and/or downlink transmission in respective network links 114, in an embodiment. In another embodiment, the link monitoring engine 202 is configured to collect link metrics 202 during regular operation of the communication network 100 without systemically varying settings of network links 114 in the communication network 100.

The link metrics analyzer 212 is configured to analyze the link metrics 202 collected by the link monitoring engine 210 to detect relationships between transmission of signals on ones of the network links 114 and qualities of other ones of the network links 114, in an embodiment. The link metrics analyzer 212 is configured to determine effects that transmission of signals in uplink and/or downlink direction in one network link 114 has on signals transmitted in other ones of the network links 114. As an example, the link metrics analyzer 212 determines that transmission of signals at a particular speed (e.g., baud rate or effective data rate), such as maximum supported speed, on the network link 114-1 causes significant amount of crosstalk on network link 114-2 and negatively impacts quality of signal transmitted on the network link 114-2. Additionally, the link metrics analyzer 212 is configured to determine patterns of usage of the network links 114 in the communication network 100, such as specific times at which respective network links 114 are utilized in the communication network 100, levels of activity of respective network links 114 at various times of operation of the communication network 100, specific throughput requirements of the respective network links 114 at various times of operation of the communication network 100, etc., in various embodiments. In an embodiment, the link metrics analyzer 212 is configured to determine, based on analyzing the link metrics 202, patterns of usage the network links 114 associated with events that occur at various times of usage of the communication network 100, such as meetings, training sessions, etc. in the enterprise that utilizes the communication network 100.

The link setting optimizer 214 is configured to determine link settings 204 for the network links 114 to improve or optimize performance across the network links 114. In an embodiment, the link setting optimizer 214 is configured to determine link settings 204 based on one or more of i) the relationships between link qualities of data transmitted on respective network links 114 detected by the link metrics analyzer 212, ii) the usage patterns detected by the link metrics analyzer 212, iii) the PHY capabilities of the network device 104 and the endpoint devices 108 obtained by the link monitoring engine 210 and iv) link provisioning requirements 208 provided for the network links 114. The link settings 204 include respective PHY parameters to be used for communication in downlink and/or uplink directions on respective network links 114, in an embodiment. For example, the link settings 204 for a particular network link 114 include one or more of i) a baud rate to be used for transmission of signals in the uplink direction on the particular network link 114, ii) a baud rate to be used for transmission of signals in the downlink direction on the particular network link 114, iii) an effective data rate to be used for transmission of signals in the uplink direction on the particular network link 114, iv) an effective data rate to be used for transmission of signals in the downlink direction on the particular network link 114, iv) transmit power level to be used for transmission of signals in the uplink direction on the particular network link 114, and vi) transmit power level to be used for transmission of signals in the downlink direction on the particular network link 114. In other embodiments, the link settings 204 additionally or alternatively include other suitable network link settings. For example, the link setting optimizer 214 is configured to determine that the baud rate, effective data rate and/or transmit power level should be increased or decreased in particular network links 114 at particular times of operation of the communication network 100 in order to decrease adverse effect that transmission of signals on the particular network links 114 causes in other ones of the network links 114.

In an embodiment, the link settings optimizer 214 is configured determine the link settings 204 further based on priorities of respective network links 114, types of activities performed on the network links 114, types of data transmitted via the network links 114, etc. For example, the link settings optimizer 214 is configured to assign relatively higher baud rates, higher effective data rates and/or higher transmit power levels to network links 114 that have higher priorities or are used for transmission of more important traffic and assign relatively lower baud rates, relatively lower effective data rates and/or relatively lower transmit power levels to network links 114 that have relatively lower priorities or are used for transmission of relatively less important traffic. As a more specific example, in an embodiment, the link settings optimizer 214 is configured to assign a relatively lower baud rate, a relatively lower effective data rate and/or relatively lower transmit power level to a network link 114 that is used for playing music or watching a video as compared to a network link 114 that is used for transmission of data in connection with performing a work-related simulation.

In some embodiments, the link setting optimizer 214 is configured to determine different sets of link settings 204 to be used at different times throughout the day (e.g., morning, lunchtime, evening, every hour, etc.), the link settings 204 determined to optimize performance across the network links 114 for different usage patterns of the communication network 100 throughout the day, and to store the different link settings 204 in the memory 220 coupled to the network optimizer 200 so that the different sets of links settings can be applied to the network links 114 at appropriate times during operation of the communication network 100.

In an embodiment, the link setting optimizer 214 is configured to determine asymmetric link configurations for at least some of the network links 114. For example, in an embodiment, the network optimizer 142 determines, for at least one of the network links 114, i) a first baud rate for transmission of data in downlink direction via the network link and ii) a second baud rate for transmission of data in uplink direction via the network link, the second baud rate being different (e.g., higher or lower) as compared to the first baud rate, in an embodiment. As another example, the network optimizer 142 determines, for at least one of the network links 114, i) a first effective data rate for transmission of data in downlink direction via the network link 114 and ii) a second effective data rate for transmission of data in uplink direction via the network link 114, the second effective data rate being different (e.g., higher or lower) as compared to the first effective data rate, in an embodiment. As yet another example, the network optimizer 142 determines, for at least one of the network links 114, i) a first transmit power level for transmission of data in downlink direction via the network link 114 and ii) a second transmit power level for transmission of data in uplink direction via the network link 114, the second transmit power level being different (e.g., higher or lower) as compared to the first transmit power level, in an embodiment. In some cases, the link setting optimizer 214 determines i) symmetric link settings to be used for one or more of the network links 114 and ii) asymmetric link settings for other one or more of the network links 114. In other cases, the link setting optimizer 214 determines either symmetric link settings or asymmetric link settings for all of the network links 114.

In an embodiment, the link metrics analyzer 212 comprises one or more machine learning models, such as one or more neural networks, trained or otherwise configured to detect relationships between transmission of signals on ones of the network links 114 and qualities of other ones of the network links 114, to detect patterns of usage of the network links 114, etc. based on the link metrics 202. Similarly, the link setting optimizer 214 comprises one or more machine learning models, such as one or more neural networks, trained or otherwise configured to determine link settings 204 for the network links 114 to optimize overall performance of across the network links 114 while ensuring that links provisioning requirements provided in the network information 206 are met for the network links 114. In an embodiment, the link setting optimizer 214 is configured to utilize one or more cost functions, such as a max-min throughput cost function to determine link settings 204 that maximize the minimum throughput across the network links 114 and/or a max sum throughout cost function to maximize the sum of throughput across the network links 114. In other embodiments, other suitable cost functions are additionally or alternatively utilized. For example, optimization other than throughput maximization, such as SNR optimization, data error minimization, etc. is utilized, in some embodiments. In an embodiment, the link setting optimizer 214 is configured to perform multiple iterations of determining the links settings 204, providing the determined link settings 204 to the network device 104 and/or endpoint devices 108, obtaining link metrics 202 with the network links 114 configured according to the link settings 204, and adjusting the links settings 204 to better optimize performance across the network links 114.

Although the link monitoring engine 202, the link analyzer 204 and the link setting optimizer 206 are illustrated in FIG. 2 as separate blocks, functionality of two or more of the link monitoring engine 202, the link metrics analyzer 204 and the link setting optimizer 206 is combined into a single processing block, in some embodiments. For example, functionality of the link analyzer 204 and the link setting optimizer 206 is combined into a single optimizer (e.g., a single machine learning model, such as a single neural network) configured to jointly analyze link metrics indicative of crosstalk in network links and to determine link settings that optimize performance of the network, in some embodiments.

Figure 3:
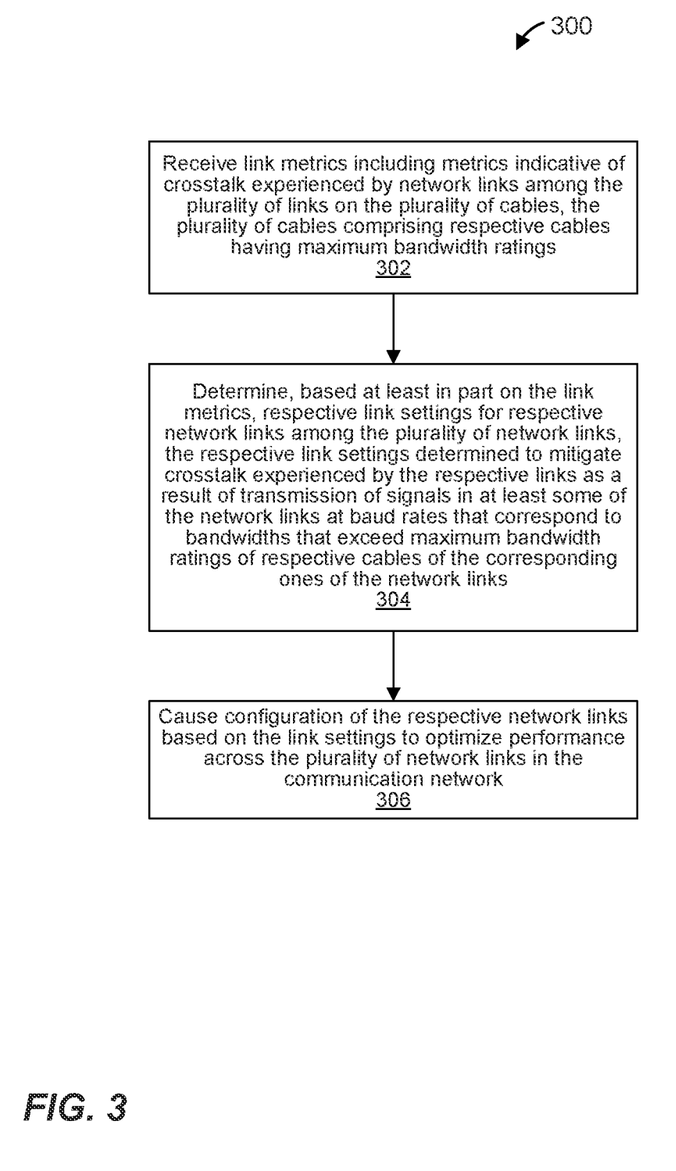
FIG. 3 is a flow diagram of an example method for configuring a plurality of network links on a plurality of cables in a communication network, according to an embodiment.

FIG. 3 is a flow diagram of an example method 300 for configuring a plurality of network links on a plurality of cables in a communication network, according to an embodiment. In an embodiment, the method 300 is implemented by the network controller 140 of FIG. 1, and the method 300 is described with reference to FIG. 1 for ease of explanation. In an embodiment, the method 300 is implemented by the network optimizer 200 of FIG. 2. In other embodiments, the method 300 is implemented by a suitable network controller different from the network controller 140 of FIGS. 1 and/or a suitable network optimizer different from the network optimizer 200 of FIG. 2.

At block 302, link metrics are received by a network controller device. The link metrics are received from one or more network devices, such as switch, hub and/or endpoint devices, communicatively coupled to the plurality of cables. The link metrics include metrics indicative of crosstalk experienced by network links among the plurality of network links between the network devices via the plurality of cables. For example, the link metrics include, for each of at least some of the network links among the plurality of network links, one or more of i) bit error rate for data transmitted in the downlink (e.g., from the network device 104 to the endpoint devices 108) and/or uplink direction (e.g., from the endpoint devices 108 to the network device 104) via the network link 114, ii) frame error rate for data transmitted in the downlink and/or uplink direction via the network link 114, iii) number of correctable errors in data transmitted in the downlink and/or uplink direction via the network link 114, iv) signal to noise ratio (SNR) in signals transmitted in the downlink and/or uplink direction via the network link 114. In an embodiment, the link metrics are collected by the network controller over a period of time of operation of the communication network, such as over a day, a week, a month, etc., at setup or maintenance time of the communication network. In an embodiment, the link metrics are received during regular operation of the communication network.

At block 304, link settings for the network links are determined based at least in part on the link metrics received at block 302. In an embodiment, the link settings are determined to mitigate crosstalk experienced by the respective network links as a result of transmission of signals in at least some of the network links at baud rates that correspond to bandwidths that exceed maximum bandwidth ratings of respective cables of the corresponding ones of the other links. For example, link settings that globally optimize performance across the network links are determined. In an embodiment, determining the link settings at block 304 includes i) analyzing the link metrics received at block 302 to determine relationships between transmission of signals on ones of the network links and qualities of other ones of the network links and ii) determining the link settings to reduce adverse effects of crosstalk between network links while maintaining acceptable or required performance on the respective ones of the network links.

At block 306, the network controller causes configuration of the respective network links based on the network configuration profile to optimize throughput in the communication network. For example, the network controller provides the determined link settings to one or more network devices in the communication network. The one or more network devices configure the network links according to the determined link settings. For example, the one or more network devices set baud rates, effective data rates, transmit power levels, etc. for communication over the respective network links according to the determined link settings. In an embodiment, the network controller provides, to the one or more network devices in the communication network, different sets of link settings at different times of day during operation of the communication network, the different sets of settings determined to optimize performance on the network links at the different times of day during operation of the communication network. In some embodiments, the network controller provides, to the one or more network devices, link settings dynamically determined during regular operation of the communication network based on link metrics received from the one or more network devices during regular operation of the communication network. The network controller thus causes adjustment of link settings to dynamically reconfigure the network links during regular operation of the communication network. Such global optimization of the network link settings mitigates effects of crosstalk between cables that are not rated for high baud rates used for transmission over the cables in the network, while maintaining suitable performance and meeting requirements for the network links in the network, in at least some embodiments. Thus, such global optimization of the network link settings allows use of the higher baud rates on at least some network links with existing, already installed cables (e.g., Cat5 and Cat5e cables, or even Cat3 cables), i.e., without having to install new cabling, while still providing adequate performance of the entire network.

Embodiment 1: A method for configuring a plurality of network links on a plurality of cables between network devices in a communication network, the method comprising: receiving, at a network controller, link metrics including metrics indicative of crosstalk experienced by network links among the plurality of network links on the plurality of cables, the plurality of cables comprising respective cables having maximum bandwidth ratings; determining, at the network controller based at least in part on the link metrics, respective link settings for respective network links among the plurality of network links, the respective link settings determined to mitigate crosstalk experienced by the respective network links as a result of transmission of signals in at least some of the network links at baud rates that correspond to bandwidths that exceed maximum bandwidth ratings of respective cables of the corresponding ones of the network links; and causing, by the network controller device, configuration of the respective network links based on the link settings to optimize performance across the plurality of network links in the communication network.

Embodiment 2: The method of embodiment 1, wherein receiving the link metrics includes receiving, for each of one or more network links among the plurality of network links, one or more of i) bit error rate for data transmitted in one or both of downlink and uplink direction via the network link, ii) frame error rate for data transmitted in one or both of downlink and uplink direction via the network link, iii) number of correctable errors in data transmitted in one or both of downlink and uplink direction via the network link, iv) signal to noise ratio (SNR) in signals transmitted in one or both of downlink and uplink direction via the network link.

Embodiment 3: The method of embodiment 1 or 2, wherein determining the link settings includes i) analyzing the link metrics to determine relationships between transmission of signals on ones of the network links and qualities of other ones of the network links and ii) determining the link settings based on the determined relationships to reduce adverse effects of crosstalk between the network links.

Embodiment 4: The method of embodiment claim 3, wherein determining the link settings further includes i) analyzing the link metrics to determine expected usage of network links among the plurality of network links and ii) determining the link settings further based on the expected usage of the network links.

Embodiment 5: The method of any of the embodiments 1-4, wherein determining the link settings comprises determining one or more of i) respective baud rates for respective network links among the plurality of network links, ii) respective transmit power levels for respective network links among the plurality of network links and iii) respective effective data rates for respective network links among the plurality of network links.

Embodiment 6: The method of any of the embodiments 1-5, wherein determining the link settings includes determining an asymmetric configuration for at least one of the network links, including determining i) a first baud rate for transmission of data in downlink direction via the network link and ii) a second baud rate for transmission of data in uplink direction via the network link, the second baud rate being different from the first baud rate.

Embodiment 7: The method of any of the embodiments 1-6, wherein determining the link settings includes determining an asymmetric configuration for at least one of the network links, including determining i) a first effective data rate for transmission of data in downlink direction via the network link and ii) a second effective data rate for transmission of data in uplink direction via the network link, the second effective data rate being different from the first effective data rate.

Embodiment 8: The method of any of the embodiments 1-7, wherein determining the link settings includes determining an asymmetric configuration for at least one of the network links, including determining i) a first transmit power level for transmission of data in downlink direction via the network link and ii) a second transmit power level for transmission of data in uplink direction via the network link, the second transmit power level being different from the first transmit power level.

Embodiment 9: The method of any of the embodiments 1-8, further comprising: receiving, at the network controller device, network information including one or more link provisioning constraints specifying performance requirements for one or more constrained network links among the plurality of network links, and determining the link settings further based on the link provisioning constraints to ensure that the specified performance requirements are met for the one or more constrained network links.

Embodiment 10: The method of embodiment 9, wherein determining the link settings includes evaluating a cost function to optimize throughput of the plurality of network links in the communication network while meeting the provisioning constraints for the one or more constrained network links in the communication network.

Embodiment 11: A network controller comprises a processor and a memory storing instructions that, when executed by the processor, cause the processor to: receive link metrics for a plurality of network links on a plurality of cables between network devices in a communication network, the link metrics including metrics indicative of crosstalk experienced by network links among the plurality of network links on the plurality of cables, the plurality of cables comprising respective cables having maximum bandwidth ratings; determine, based at least in part on the link metrics, respective link settings for respective network links among the plurality of network links, the respective link settings determined to mitigate crosstalk experienced by the respective network links as a result of transmission of signals in at least some of the network links at baud rates that correspond to bandwidths that exceed maximum bandwidth ratings of respective cables of the corresponding ones of the network links; and cause configuration of the respective network links based on the link settings to optimize performance across the plurality of network links in the communication network.

Embodiment 12: The network controller of embodiment 11, wherein the instructions, when executed by the processor, cause the processor to receive, for each of one or more network links among the plurality of network links, one or more of i) bit error rate for data transmitted in one or both of downlink and uplink direction via the network link, ii) frame error rate for data transmitted in one or both of downlink and uplink direction via the network link, iii) number of correctable errors in data transmitted in one or both of downlink and uplink direction via the network link, iv) signal to noise ratio (SNR) in signals transmitted in one or both of downlink and uplink direction via the network link.

Embodiment 13: The network controller of embodiment 11 or 12, wherein the instructions, when executed by the processor, cause the processor to determine the link settings at least by i) analyzing the link metrics to determine relationships between transmission of signals on ones of the network links and qualities of other ones of the network links and ii) determining the link settings based on the determined relationships to reduce adverse effects of crosstalk between network links.

Embodiment 14: The network controller of embodiment 13, wherein the instructions, when executed by the processor, cause the processor to determine the link settings further by i) analyzing the link metrics to determine expected usage of network links among the plurality of network links and ii) determining the link settings further based on the expected usage of the network links.

Embodiment 15: The network controller of any of embodiments 11-14, wherein the instructions, when executed by the processor, cause the processor to determine, based at least in part on the link metrics, one or more of i) respective baud rates for respective network links among the plurality of network links, ii) respective transmit power levels for respective network links among the plurality of network links and iii) respective effective data rates for respective network links among the plurality of network links.

Embodiment 16: The network controller of any of embodiments 11-15, wherein the instructions, when executed by the processor, cause the processor to determine, based at least in part on the link metrics, asymmetric configurations for at least one of the network links, including determining i) a first baud rate for transmission of data in downlink direction via the network link and ii) a second baud rate for transmission of data in uplink direction via the network link, the second baud rate being different from the first baud rate.

Embodiment 17: The network controller of any of embodiments 11-16, wherein the instructions, when executed by the processor, cause the processor to determine, based at least in part on the link metrics, asymmetric configurations for at least one of the network links, including determining i) a first effective data rate for transmission of data in downlink direction via the network link and ii) a second effective data rate for transmission of data in uplink direction via the network link, the second effective data rate being different from the first effective data rate.

Embodiment 18: The network controller of any of embodiments 11-17, wherein the instructions, when executed by the processor, cause the processor to determine, based at least in part on the link metrics, asymmetric configurations for at least one of the network links, including determining i) a first transmit power level for transmission of data in downlink direction via the network link and ii) a second transmit power level for transmission of data in uplink direction via the network link, the second transmit power level being different from the first transmit power level.

Embodiment 19: The network controller of any of embodiments 11-18, further storing instructions that, when executed by the processor, cause the processor to: receive network information including one or more link provisioning constraints specifying performance requirements for one or more constrained network links among the plurality of network links, and determine the link settings further based on the link provisioning constraints to ensure that the specified performance requirements are met for the one or more constrained network links.

Embodiment 20: The network controller of embodiment 19, wherein the instructions, when executed by the processor, cause the processor to determine the link settings at least by evaluating a cost function to optimize throughput of the plurality of network links in the communication network while meeting the provisioning constraints for the one or more constrained network links in the communication network.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory coupled to the processor, such as a RAM, a ROM, a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for configuring a plurality of network links on a plurality of cables between network devices in a communication network, the method comprising:
   receiving, at a network controller, link metrics including metrics indicative of crosstalk experienced by network links among the plurality of network links on the plurality of cables, the plurality of cables comprising respective cables having maximum bandwidth ratings;
   determining, at the network controller based at least in part on the link metrics, respective link settings for respective network links among the plurality of network links, the link settings for a first respective network link determined based on i) link metrics for the first respective network link and ii) effects that transmission of signals on the first respective network link has on concurrent transmission of signals on other ones of network links among the plurality of network links, to mitigate crosstalk experienced by the respective network links as a result of transmission of signals in at least some of the network links at baud rates that correspond to bandwidths that exceed maximum bandwidth ratings of respective cables of the corresponding ones of the network links; and
   causing, by the network controller device, configuration of the respective network links based on the link settings to optimize performance across the plurality of network links in the communication network.

2. The method of claim 1, wherein receiving the link metrics includes receiving, for each of one or more network links among the plurality of network links, one or more of i) bit error rate for data transmitted in one or both of downlink and uplink direction via the network link, ii) frame error rate for data transmitted in one or both of downlink and uplink direction via the network link, iii) number of correctable errors in data transmitted in one or both of downlink and uplink direction via the network link, iv) signal to noise ratio (SNR) in signals transmitted in one or both of downlink and uplink direction via the network link.

3. The method of claim 1, wherein determining the link settings includes i) analyzing the link metrics to determine relationships between transmission of signals on ones of the network links and qualities of other ones of the network links and ii) determining the link settings based on the determined relationships to reduce adverse effects of crosstalk between the network links.

4. The method of claim 3, wherein determining the link settings further includes i) analyzing the link metrics to determine expected usage of network links among the plurality of network links and ii) determining the link settings further based on the expected usage of the network links.

5. The method of claim 1, wherein determining the link settings comprises determining one or more of i) respective baud rates for respective network links among the plurality of network links, ii) respective transmit power levels for respective network links among the plurality of network links and iii) respective effective data rates for respective network links among the plurality of network links.

6. The method of claim 1, wherein determining the link settings includes determining an asymmetric configuration for at least one of the network links, including determining i) a first baud rate for transmission of data in downlink direction via the network link and ii) a second baud rate for transmission of data in uplink direction via the network link, the second baud rate being different from the first baud rate.

7. The method of claim 1, wherein determining the link settings includes determining an asymmetric configuration for at least one of the network links, including determining i) a first effective data rate for transmission of data in downlink direction via the network link and ii) a second effective data rate for transmission of data in uplink direction via the network link, the second effective data rate being different from the first effective data rate.

8. The method of claim 1, wherein determining the link settings includes determining an asymmetric configuration for at least one of the network links, including determining i) a first transmit power level for transmission of data in downlink direction via the network link and ii) a second transmit power level for transmission of data in uplink direction via the network link, the second transmit power level being different from the first transmit power level.

9. The method of claim 1, further comprising:
receiving, at the network controller device, network information including one or more link provisioning constraints specifying performance requirements for one or more constrained network links among the plurality of network links, and
determining the link settings further based on the link provisioning constraints to ensure that the specified performance requirements are met for the one or more constrained network links.

10. The method of claim 9, wherein determining the link settings includes evaluating a cost function to optimize throughput of the plurality of network links in the communication network while meeting the provisioning constraints for the one or more constrained network links in the communication network.

11. A network controller, comprising:
a processor; and
a memory storing instructions that, when executed by the processor, cause the processor to:
receive link metrics for a plurality of network links on a plurality of cables between network devices in a communication network, the link metrics including metrics indicative of crosstalk experienced by network links among the plurality of network links on the plurality of cables, the plurality of cables comprising respective cables having maximum bandwidth ratings,
determine, based at least in part on the link metrics, respective link settings for respective network links among the plurality of network links, the link settings for a first respective network link determined based on i) link metrics for the first respective network link and ii) effects that transmission of signals on the first respective network link has on concurrent transmission of signals on other ones of network links among the plurality of network links, to mitigate crosstalk experienced by the respective network links as a result of transmission of signals in at least some of the network links at baud rates that correspond to bandwidths that exceed maximum bandwidth ratings of respective cables of the corresponding ones of the network links, and
cause configuration of the respective network links based on the link settings to optimize performance across the plurality of network links in the communication network.

12. The network controller of claim 11, wherein the instructions, when executed by the processor, cause the processor to receive, for each of one or more network links among the plurality of network links, one or more of i) bit error rate for data transmitted in one or both of downlink and uplink direction via the network link, ii) frame error rate for data transmitted in one or both of downlink and uplink direction via the network link, iii) number of correctable errors in data transmitted in one or both of downlink and uplink direction via the network link, iv) signal to noise ratio (SNR) in signals transmitted in one or both of downlink and uplink direction via the network link.

13. The network controller of claim 11, wherein the instructions, when executed by the processor, cause the processor to determine the link settings at least by i) analyzing the link metrics to determine relationships between transmission of signals on ones of the network links and qualities of other ones of the network links and ii) determining the link settings based on the determined relationships to reduce adverse effects of crosstalk between network links.

14. The network controller of claim 13, wherein the instructions, when executed by the processor, cause the processor to determine the link settings further by i) analyzing the link metrics to determine expected usage of network links among the plurality of network links and ii) determining the link settings further based on the expected usage of the network links.

15. The network controller of claim 11, wherein the instructions, when executed by the processor, cause the processor to determine, based at least in part on the link metrics, one or more of i) respective baud rates for respective network links among the plurality of network links, ii) respective transmit power levels for respective network links among the plurality of network links and iii) respective effective data rates for respective network links among the plurality of network links.

16. The network controller of claim 11, wherein the instructions, when executed by the processor, cause the processor to determine, based at least in part on the link metrics, asymmetric configurations for at least one of the network links, including determining i) a first baud rate for transmission of data in downlink direction via the network link and ii) a second baud rate for transmission of data in uplink direction via the network link, the second baud rate being different from the first baud rate.

17. The network controller of claim 11, wherein the instructions, when executed by the processor, cause the processor to determine, based at least in part on the link metrics, asymmetric configurations for at least one of the network links, including determining i) a first effective data rate for transmission of data in downlink direction via the network link and ii) a second effective data rate for transmission of data in uplink direction via the network link, the second effective data rate being different from the first effective data rate.

18. The network controller of claim 11, wherein the instructions, when executed by the processor, cause the processor to determine, based at least in part on the link metrics, asymmetric configurations for at least one of the network links, including determining i) a first transmit power level for transmission of data in downlink direction via the network link and ii) a second transmit power level for transmission of data in uplink direction via the network link, the second transmit power level being different from the first transmit power level.

19. The network controller of claim 11, further storing instructions that, when executed by the processor, cause the processor to:
receive network information including one or more link provisioning constraints specifying performance requirements for one or more constrained network links among the plurality of network links, and determine the link settings further based on the link provisioning constraints to ensure that the specified performance requirements are met for the one or more constrained network links.

20. The network controller of claim 19, wherein the instructions, when executed by the processor, cause the processor to determine the link settings at least by evaluating a cost function to optimize throughput of the plurality of network links in the communication network while meeting the provisioning constraints for the one or more constrained network links in the communication network.

\* \* \* \* \*